United States Patent [19]

Knapp

[11] Patent Number: 4,872,767
[45] Date of Patent: Oct. 10, 1989

[54] BEARING SUPPORT

[75] Inventor: Malcolm H. Knapp, Lynnfield, Mass.

[73] Assignee: General Electric Company, Lynn, Mass.

[21] Appl. No.: 719,606

[22] Filed: Apr. 3, 1985

[51] Int. Cl.⁴ .............................................. F16C 27/00
[52] U.S. Cl. ..................................... 384/99; 384/535; 384/581
[58] Field of Search .................. 384/99, 535, 536, 581, 384/582, 276, 215, 218

[56] References Cited

U.S. PATENT DOCUMENTS

| | | | |
|---|---|---|---|
| 2,614,896 | 10/1952 | Pierce | 384/99 |
| 2,874,008 | 2/1959 | Orte et al. | 384/536 |
| 2,897,023 | 7/1959 | Burkhalter et al. | |
| 3,053,590 | 9/1962 | Dison | |
| 3,170,736 | 2/1965 | Wright | |
| 3,322,474 | 5/1967 | Destival | 384/215 |
| 3,554,619 | 1/1971 | Irwin | |
| 3,709,570 | 1/1973 | Galbato | |
| 3,950,964 | 4/1976 | Alexeeva | |
| 4,027,931 | 6/1977 | Streifert | |
| 4,044,628 | 8/1977 | Jacks | |
| 4,084,861 | 4/1978 | Greenberg | |
| 4,133,585 | 1/1979 | Licht | |
| 4,134,309 | 1/1979 | Balke | |
| 4,145,936 | 3/1979 | Vincent | |
| 4,213,661 | 7/1980 | Marmol | 384/99 |
| 4,289,360 | 9/1981 | Zirin | |
| 4,325,650 | 4/1982 | Masai | |
| 4,451,110 | 5/1984 | Forestier | |

FOREIGN PATENT DOCUMENTS

| | | | |
|---|---|---|---|
| 777312 | 2/1935 | France | |
| 915580 | 11/1946 | France | |
| 182963 | 6/1966 | U.S.S.R. | 384/535 |
| 406048 | 11/1973 | U.S.S.R. | 384/276 |
| 612768 | 11/1948 | United Kingdom | |
| 1120426 | 7/1968 | United Kingdom | |
| 1351567 | 5/1974 | United Kingdom | |
| 1355268 | 6/1974 | United Kingdom | |

Primary Examiner—Thomas R. Hannon
Attorney, Agent, or Firm—Francis L. Conte; Jerome C. Squillaro

[57] ABSTRACT

The invention comprises a compact support for a bearing associated with a rotating member such as a shaft of a gas turbine engine. The bearing support has one or more circumferential leaf spring elements which provide radially resilient support for the shaft while being axially stiff to reduce axial thrust movement of the shaft. The spring rate of the support is designed to shift engine vibratory resonances so that they occur outside the normal speed range of the engine; and the support may include internal damping to minimize resonant vibratory peaks. Various bearing support embodiments are also disclosed.

24 Claims, 3 Drawing Sheets

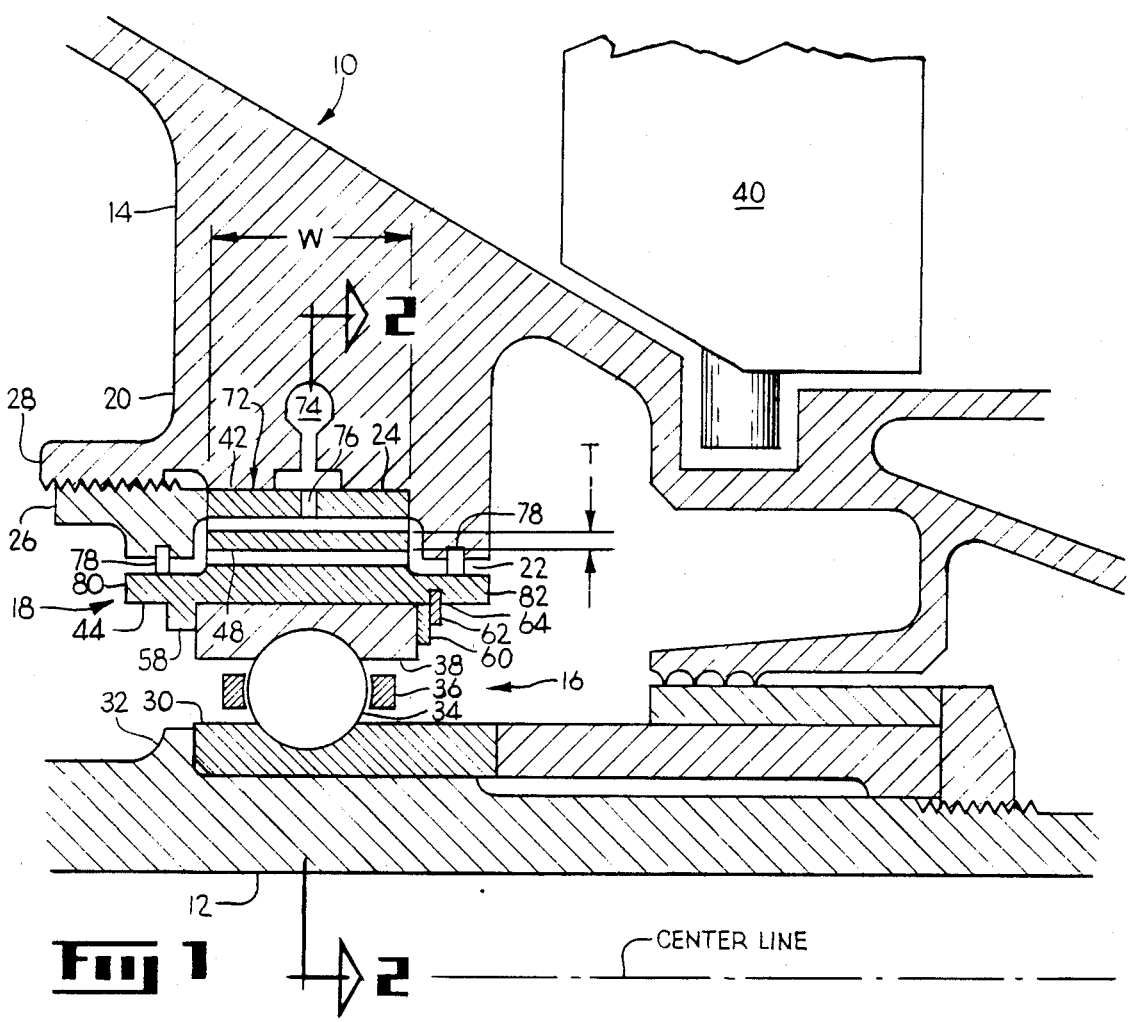
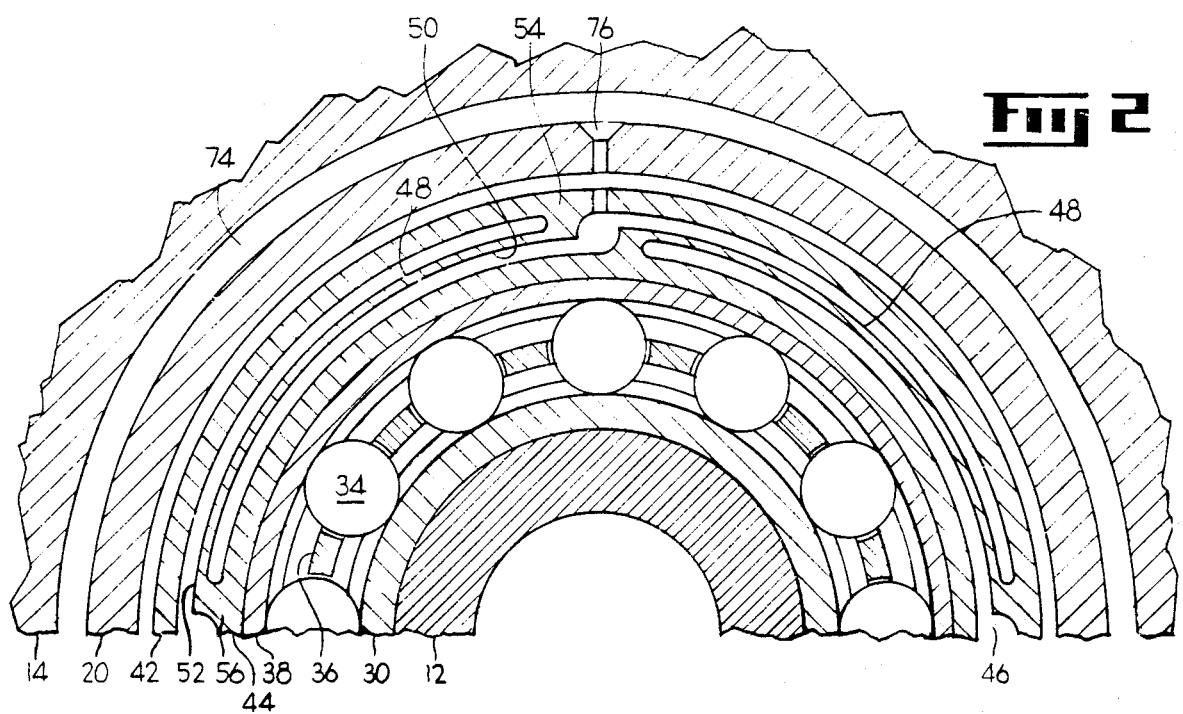

BEARING SUPPORT

FIELD OF THE INVENTION

This invention relates to bearing supports for rotary engines and more particularly to an axially and radially compact, radially resilient bearing support having integral fluid damping capability for the control of gas turbine engine vibratory dynamics.

BACKGROUND OF THE INVENTION

Modern high speed engines, or motors, are susceptible to vibration excitation due to their high rotor rotation speeds and high operating temperatures. This has been a particular concern in aircraft gas turbine engines. In these engines, the rotors are often supported from stationary engine housings or frames by spring mountings to control rotor vibration. Each spring mounting commonly includes an anti-friction bearing and a bearing support. The radial spring rate and damping characteristics of the mountings are important factors for proper high speed engine operation of the bearing and shaft system.

In gas turbine engines, rotor shafts often encounter several resonant vibratory peaks due to rotor speed, deflected rotor shapes and minor unbalances. As a result, some radial movement of the shaft must be provided for obtaining acceptable engine vibration limits. Such movement, however, must be controlled and cushioned to prevent internal engine damage caused by contact of adjacent stationary and rotating parts. Bearing supports must, therefore, permit shafts to make small radial vibratory excursions, but prevent extreme shaft movements. Typically, a preferred cushioning spring rate for such a bearing support in a gas turbine engine is on the order of 30,000–150,000 lbs-force per inch of displacement.

One type of conventional resilient rotor bearing support comprises an axially extending cantilevered spoked cylinder or cone to support and cushion the shaft bearing. This support, commonly called a "squirrel cage" bearing support, has been used successfully to support the rotor shaft. Further, such bearing supports are designed to move undesirable vibratory resonant frequencies to rotor speeds above or below normal engine operating speeds. This reduces to a minimum the amount of time that these engines are exposed to significant vibratory resonances.

It is also useful in these types of supports to include damping in the spring mounting. Typically, the damping effect is created by supplying oil into a cavity between the bearing support and engine frame. Sometimes this involves use of an additional damping assembly having an oil filled chamber, and damping shims between the bearing support and the engine frame. An example of such a damping assembly is found in U.S. Pat. No. 4,289,360-L. I. Zirin, entitled "Bearing Damper System."

While damped resilient bearing support systems have been used successfully to control the vibratory dynamics of modern gas turbine engines, they are not always acceptable for use in certain engine configurations. For example, conventional squirrel cage bearing supports require a substantial amount of axial space for their long cantilevered spokes. This axial space is not always readily available and the placement of the squirrel cage bearing support can interfere with preferred engine gas flow paths or increase engine length and weight. Further, since the bearing is held at the end of the cantilevered axial spokes of the squirrel cage support, misalignment of the bearing support relative to the engine frame may cause uneven bearing loading and a decrease in the useful life of the bearing.

Finally, it should be noted that squirrel-cage type supports are fairly costly due to the large number of high precision machining operations needed to make the supports and associated frame features.

Another type of conventional bearing support, which is relatively compact and inexpensive, comprises a flat single layer, circular spring support, with circumferentially alternating inner and outer lobes (stand off pads) commonly called a "ring spring." Although ring springs are cheaper than squirrel cage bearing supports, they are subject to erratic performance. This is because their spring rates vary with their radial displacements, i.e., they are nonlinear devices. Further, a degree of sliding contact is inherently present between their ring lobes and the surrounding engine frame. This sliding contact can cause undesirable lobe wear that modifies the spring rate of the support. This, may in turn, result in change of rotor resonant frequency which can lead to vibratory problems. Yet further, the ring lobes provide point loadings around the circumference of the bearing which can induce undesirable stress and deflections therein. Finally, since these devices are basically flat, relatively thin circular strips, they are incapable of providing axial support for the bearings and engine rotors, and, therefore, are not effective to accommodate axial thrust loads.

Accordingly, a need exists for an inexpensive and compact bearing support which is radially resilient, which can provide axial thrust load bearing support and which is capable of controlling and damping radial vibratory motion without sliding wear points.

SUMMARY OF THE INVENTION

It is, therefore, an object of the present invention to provide a radially resilient bearing support for a rotor shaft subject to vibratory motion.

It is another object of the present invention to provide a bearing support being relatively compact in an axial direction.

It is another object of the present invention to provide a bearing support with axial stiffness to accommodate rotor axial thrust loads.

It is another object of the present invention to provide a bearing support having increased radial stiffness in a reduced radial size.

It is another object of the present invention to provide a bearing support effective for resiliently supporting a bearing, and having integral, internal damping without the need for a separate damping assembly.

Briefly stated, these and other objects, which will become apparent from the following specification and appended drawings, are accomplished by the present invention which is an improved bearing support for a rotary shaft. The support includes elongated, arcuate circumferential spring elements, i.e., "circsprings," connected between outer and inner shells for mounting a bearing between an engine frame and the rotor shaft. The circsprings are radially resilient and axially stiff.

This support is particularly effective in controlling radial vibratory movements of engine rotor shafts passing through resonant frequencies and preventing axial rotory movement relative to the engine frame due to rotor axial thrust loads.

In an exemplary embodiment of the invention, damping fluid may be provided between the circsprings to dampen resonant buildups of vibratory motion in the engine.

BRIEF DESCRIPTION OF THE DRAWINGS

The foregoing and other objects and advantages of the invention will be apparent from the following, more particular description of the preferred embodiments of the invention, as illustrated in the accompanying drawing, in which like reference characters refer to the same parts throughout the different views. The drawing is not necessarily to scale, emphasis instead being placed on illustrating the principles of the invention.

FIG. 1 is a sectional axial view of a portion of a gas turbine engine showing one embodiment of a bearing support embodying the principles of the invention;

FIG. 2 is an enlarged view taken along section line 2—2 of FIG. 1 showing the engine bearing support in greater detail;

DETAILED DESCRIPTION

Figure 3:
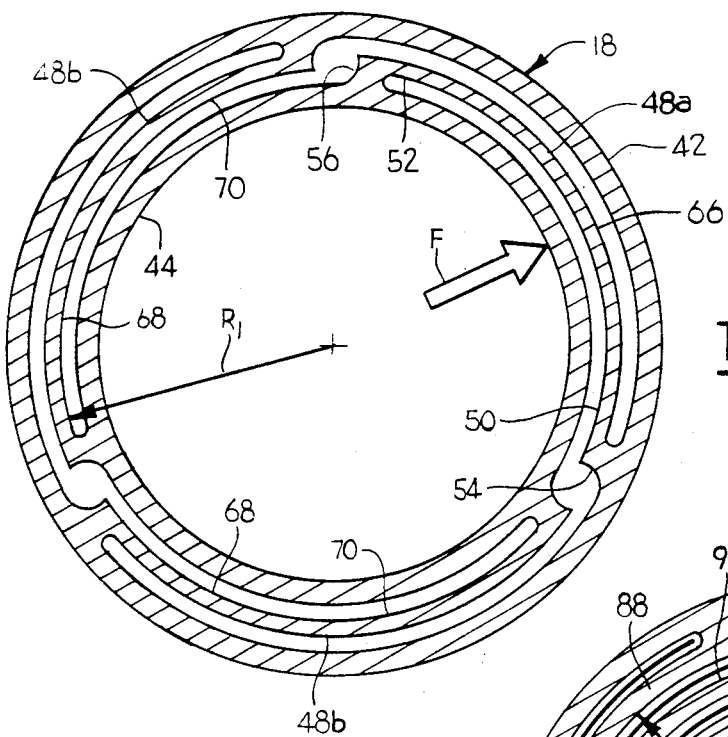
FIG. 3 is a sectional view of another embodiment of a bearing support, for use in the FIG. 1 engine, including three circsprings in circumferential alignment.

In this description, the invention is incorporated into a gas turbine engine, only a portion of which is depicted in FIG. 1 and described herein. It will be apparent, however, that the invention pertains to all other types of motors and engines which require radially resilient rotor support means to accommodate and control motor vibration.

A gas turbine engine portion shown generally at 10 in FIG. 1 has a rotor shaft 12 rotatably mounted inside an engine frame 14 by way of a conventional circular ball bearing assembly shown generally at 16. The bearing assembly 16 and the shaft 12 encircled thereby are supported within the frame 14 by a bearing support, indicated generally at 18 in accordance with one embodiment of the invention. More particularly, frame 14 has an internal annular web 20 having an axial bore or passage 22 that receives the bearing assembly 16 and support 18. Passage 22 is counterbored at 24 to seat bearing support 18. The bearing support 18 is securely held within counterbore 24 by an externally threaded annular locknut 26 which is turned into an internally threaded extension 28 at the mouth of counterbore 24.

The bearing assembly 16 includes an inner race 30 suitably mounted against a radial shoulder 32 formed on the shaft 12. The inner race 30 supports an array of ball bearings 24 maintained in spaced relation by a cage 36. An outer race 38 of the bearing 16 is suitably mounted in the inner periphery of the bearing support 18 as described below. Also partially shown in FIG. 1 is a typical guide vane 40 used to direct engine main air flow within the frame 14 flowpath.

In accordance with one embodiment of this invention, the bearing support 18 controls the radial movement of shaft 12 relative to engine frame 14. Referring to both FIGS. 1 and 2, the bearing support 18 includes a cylindrical first, outer shell 42, and a second, inner shell 44 spaced radially inwardly therefrom and concentric therewith to define an annular space or gap 46. Positioned in the annular space 46 between the two shells is one or more arcuate leaf springs 48 which extend in a substantially circumferential direction (hereafter referred to as "circsprings") and are spaced substantially parallel and concentric to both the first and second shells 42 and 44. In the illustrated support embodiment, there are four substantially identical circsprings 48 circumferentially distributed about the axial centerline axis of the bearing support. Each circspring 48 has first and second opposing ends 50 and 52, respectively, the first end 50 being suitably fixedly connected to the first shell 42, for example, by being formed integrally therewith. The second, opposite, end 52, of each circspring 48 is suitably fixedly connected to the second shell 44, for example, by being formed integrally therewith.

The fixed connections of the first and second circspring ends 50 and 52 to the first and second shells 42 and 44, respectively, may be provided by first and second integral support projections 54 and 56, respectively. The projections 54 and 56 are sized so that the circsprings 48 are positioned concentrically with the first and second shells 42 and 44 and spaced substantially equally therefrom. If the circsprings 48 were in the form of spirals, undesirable relative rotation due to the spirals would occur between the first and second shells 42 and 44 during vibratory motion which might cause slippage at the rolling surfaces of the bearing 16.

Preferably, although not necessarily, the shells 42, 44, circsprings 48 and supports projections 54, 56 are all formed as an integral unit. In some applications the ends 50, 52 of the circspring 48 may be suitably welded to the shells 42, 44.

As shown in FIG. 1, an axial width W of each circspring 48 is preferably much greater than a radial thickness T for providing axial thrust bearing capability. A width-to-thickness ratio W/T of at least 4:1 is an example for obtaining suitable thrust load bearing capability in a gas turbine engine, although lower ratios could be used.

Furthermore, inasmuch as both first and second circspring ends 50 and 52 are fixedly connected to the first and second shells 42 and 44, respectively, increased resistance to axial deflection and twisting of the circsprings 48 is obtained which would not otherwise occur if both ends 50, 52 were not fixedly connected, or if only one end were fixedly connected.

Therefore, when the bearing support 18 is incorporated into the engine 10 as shown in FIG. 1, the circsprings 48 permit a predetermined amount of radial movement of the bearing assembly 16 and shaft 12 relative to the engine frame 14 and bias the shaft 12 to a neutral position on the engine longitudinal centerline axis. A typical bearing support 18, for example, may provide a restoring force on the order of 50,000 lbs. per inch of displacement. On the other hand, the support is quite stiff in the axial direction so that it restrains the shaft 12 from significant axial movement when axial thrust is transmitted by shaft 12 through the bearing assembly 16, support 18 and into frame 14.

More specifically, in order to accommodate axial thrust, FIG. 1 illustrates one embodiment of a suitably configured bearing support 18. The first shell 42 is clamped in the frame counterbore 24 by the locknut 26. The second shell 44 has a radially inwardly extending flange 58 at one end, against which one end of the bearing outer race 38 abuts. A washer 60 is positioned against a second end of the outer race 38 and a conventional retaining ring 62 is suitably secured in a groove 64 formed in an inner surface of a second end of the second shell 44 for securing the outer race 38 to the second shell 44.

Thus, when axial thrust loads are transmitted through the shaft 12 to the bearing assembly 16, they are then transmitted through the outer race 38 against the flange 58 and through the circsprings 48 to the first shell 42 and, in turn, to the frame 14. The axial stiffness provided by the bearing support 18 provides a restraining force to accommodate the axial thrust loads.

Furthermore, the bearing support 18 is effective for providing acceptable relatively large radial stiffness in relatively small axial and radial dimensions. This is due, in part, to the fixed connections of the first and second ends 50 and 52. Of course, it is also due to the radial thickness and axial width of the circsprings 48 which affect stiffness due to bending of the circsprings 48. Bending stiffness of a member is conventionally known. However, additional radial stiffness is also provided by the disclosed invention.

More specifically, FIG. 3 illustrates another embodiment of the invention having three circumferentially spaced circsprings 48, all disposed at a single radius $R_1$ in circumferential alignment with each other to minimize the radial dimension for obtaining a radially compact bearing support. Also illustrated is a resultant radial force F which could be imposed on the bearing support 18 in operation, and is shown for explaining the increased radial stiffness realizable due to the invention. The force F will induce bending stress at a central location 66 of the circspring 48a against which the force F is directed. The circspring 48a provides radial spring resistance primarily by bending. However, in the two circsprings 48b disposed generally laterally of the force F, not only will bending occur at locations 68 extending generally parallel to force F, but compression of the circsprings 48b at locations 70 extending generally parallel to force F will also occur. Compression of the circspring 48b in its longitudinal direction at location 70 and bending in a lateral direction at location 68 provides increased stiffness in the radial direction when compared with bending only at location 66 in circspring 48a.

Of course, the increased radial stiffness of the bearing support 18 is obtainable from the other embodiments, besides the ones of FIGS. 2 and 3, disclosed above. The above description is intended only to explain the mode of operation of the bearing support 18 in one embodiment, which occurs in similar fashion in the other embodiments of the invention.

The circsprings 48 in combination with their fixed supports 54 and 56 to the shells 42 and 44, also provide considerable torsional stiffness due to primarily only compression and bending of the circspring 48 as above described and due to the concentrically disposed circspring 48. Spiral springs would provide relatively less torsional stiffness and allow for undesirable torsional displacement and therefore are not desirable.

As noted at the outset, it is desirable in bearing supports of gas turbine engines to provide damping of resonant vibrations of the engine. The embodiment illustrated in FIG. 1 incorporates a fluid damping means 72 for this purpose. As shown in FIGS. 1 and 2, oil or other damping fluid is suitably supplied or channeled to a conduit 74 in the frame web 20 which communicates with one or more small holes 76 in the first shell 42 to conduct the damping fluid into the annular space 46 between the shells 42, 44 and around the circsprings 48.

As shown in FIG. 1, a portion of the inner end of the locknut 26 is spaced from a lateral side of the circsprings 48 so that the oil is free to flow aroung the circsprings 48 into the space adjacent the second shell 44. Suitable seals 78 are seated in grooves in an inner wall of locknut 26 and in an inner surface of bore 22, respectively; the seals 78 engaging axial flanges 80 and 82 of the second shell 44 to contain the damping fluid in the bearing support 18.

Damping occurs from the surface area provided by the circsprings 48 cooperating with the damping fluid, in particular, the flexing circsprings 48 act locally to pump the damping fluid to dissipate energy. It should be noted that the circsprings 48, themselves, act a conventionally known damping shims. Accordingly, the circsprings 48 not only provide the required radial resilience and axial stiffness, but additionally provide for damping, thus resulting in a relatively simple structure providing several functions.

The circsprings 48 may be sized and configured for obtaining uniform or non-uniform and/or linear or non-linear spring rates around the circumference of the support 18 which spring rates can also be conventionally used to tune the bearing support 18 to predetermined natural resonant frequencies to avoid resonance during engine operation. The spring rate of the bearing support 18 can be changed, for example, by varying the number of circsprings 48, the circumferential positioning thereof, the thickness or length of those elements, or the material from which the bearing support is manufactured.

A more uniform and more linear spring rate can be obtained by using three or more circsprings 48 of uniform length and thickness and equally spaced around the circumference of the bearing support 18. Conversely, predetermined non-uniform and/or non-linear spring rates can be obtained by circsprings 48 of varying thickness and length and non-uniformly spaced. For example, non-uniformity may be desirable to accommodate dead weight of the shaft 12 in the bearing 16. Additional, initial spring force in a vertical direction may be suitably introduced, for example, by utilizing circsprings 48 which are relatively short and/or thick disposed near the top and/or bottom of the support 18 to offset the weight of shaft 12 so that the shaft 12 is initially coaxially aligned with the frame 14.

The circsprings 48 can be variously arranged in the bearing support 18. FIGS. 1 and 2 show a support 18 having four circsprings 48 arranged in primarily a single layer between the first and second shells 42, 44 of the bearing support 18. In another engine or application, it may be desirable to have a larger number of shorter circsprings 48 in that layer.

In a particular application, requiring very soft radial compliance, a single circspring 48 extending almost all around the annular space 46 between the two shells 42, 44 may provide the desired spring rate. Furthermore, three uniformly spaced circsprings 48, circumferentially aligned at a single radius, may be used as shown in the embodiment illustrated in FIG. 3.

Figure 4:
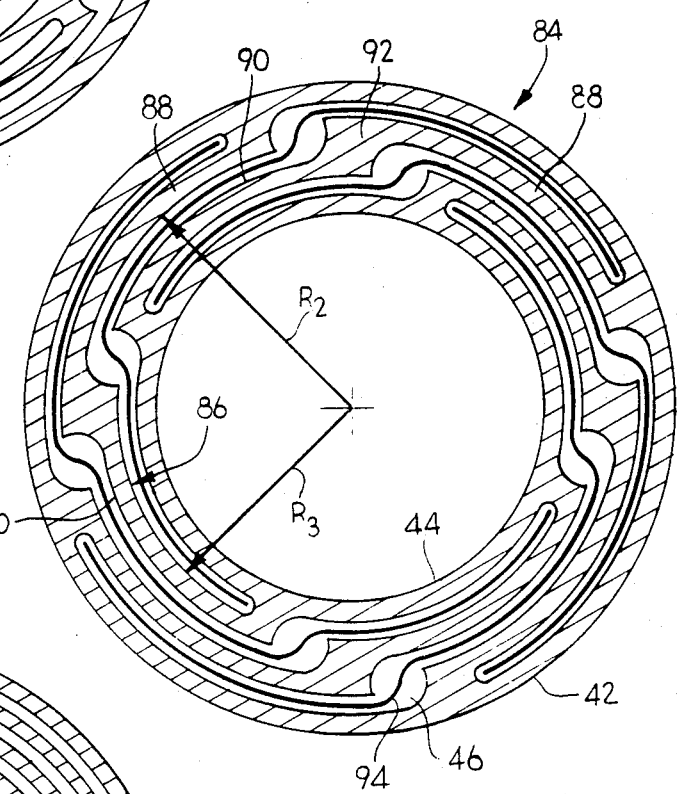
FIG. 4 is a sectional view of still another embodiment of a bearing support, including overlapping circsprings, and foil inserts for increasing damping.

Also, it is not necessary that all of the circsprings 48 be located in a single layer between the first and second shells 42, 44 of the bearing support 28. For example, FIG. 4 depicts a bearing support 84 in accordance with another embodiment of the invention having first and second shells 42, 44 with circsprings 86 located in two different concentric layers in the annular space 46 between the shells 42, 44. This embodiment illustrates four circsprings 86 each of which extends more than one-quarter of the circumference of the annular space 46 so that the circsprings 86 overlap each other.

Each circspring 86 includes first and second arcuate portions 88 and 90, respectively, interconnected at a preferably integral jog or stepped portion 92 so that the first and second portions 88, 90 have different radii, $R_2$ and $R_3$, respectively, and the second portions 90 overlap and are spaced from first portions 88 of adjacent circsprings 86 to remain substantially arcuate (except at the jog portion 92) to ensure that both first and second circspring portions 88, 90 remain concentric with the shells 42, 44, thusly avoiding any spiral in the circsprings 86.

The arrangement of overlapping circsprings 86 enables the bearing support 84 to have a radial spring rate which is more uniform around the entire circumference of the support due to the longer length of the circspring 86 subject to bending. In other words, the restoring force of the circsprings 86 will be substantially uniform whichever way the second shell 44 is deflected radially. Of course, the circsprings 86 being longer also decrease the radial stiffness of the bearing support.

When incorporated into the FIG. 1 engine, the bearing support 84 will also provide more damping than the support 28. This is because the circumferentially longer circsprings 86 have more surface area exposed to the damping fluid. Even more damping can be provided in any of the embodiments of the invention by including thin metal or foil inserts 94 in the spaces between the adjacent circsprings 86 as shown, for example, in FIG. 4. While these thin inserts 94 do not substantially affect the spring constant of the bearing support 86, they increase the surface area exposed to the damping fluid.

Figure 5:
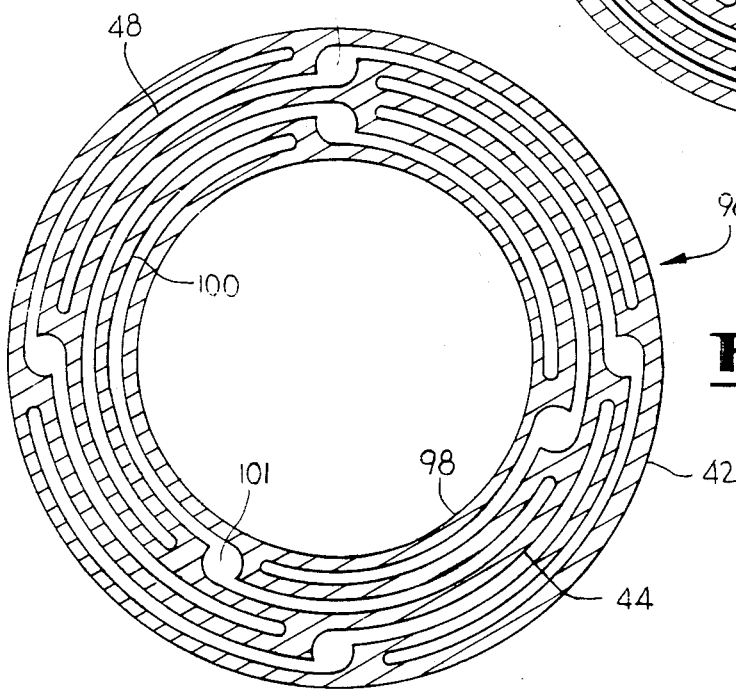
FIG. 5 is a sectional view of still another embodiment of a bearing support, for use in the FIG. 1 engine, including three concentric shells with two sets of circsprings disposed in inner and outer annular gaps formed therebetween.

Other variations in the geometry of the circsprings in the bearing support are possible to achieve desired spring and damping characteristics for particular applications. For example, FIG. 5 shows a bearing support 96 in accordance with another embodiment of the invention which comprises an additional, third annular shell 98 spaced radially inwardly of the second shell 44. A plurality of first circsprings 48, like those in FIG. 1, are similarly fixedly connected to the first and second shells 42, 44. A plurality of second circsprings 100 are similarly fixedly connected to the second and third shells 44, 98 in the second annular space or gap 101 therebetween. In this embodiment, there is a layer of four first circsprings 48 located in the first annular space 46 between the first and second shells 42, 44. A second layer of three second circsprings 100 is located in the second annular space 101 between the second and third shells 44, 98. Thus, the bearing support 96 has a double layer of circsprings 48, 100 which provide for a more uniform spring rate around the circumference of the support.

Furthermore, in the embodiment illustrated in FIG. 5, the first circsprings 48 extend from the first shell 42 to the second shell 44 in a first, couterclockwise, circumferential direction, and the second circsprings 100 extend from the second shell 44 to the third shell in a second, opposite, clockwise, circumferential direction. This arrangement can help to eliminate any adverse effects caused by the radial displacement of the circsprings 48, 100. For example, any tendency for the second shell 44 to rotate under deflection can be offset by any tendency of the third shell 98 to rotate in an opposite direction due to the opposing orientations of the circsprings 48, 100.

Yet further, the first circsprings 48 can be designed to be relatively stiff for overload protection while the second circsprings 100 are designed to that stiffness for normal operation of the shaft 12.

Yet further, the first and second circsprings 48, 100 are disposed in series which can result in an embodiment having an overall relatively softer spring rate less than that due to a simple arithmatic addition thereof.

In the bearing supports discussed thus far, the circsprings in each layer of the bearing support are generally similar. In some applications, nonuniform spring elements may be used so that the bearing support has a spring rate which is different around the circumference of the support. For example, a given support might be designed so that it is more stiff to vertical deflections than to lateral deflections. Thus, such increased stiffness in the vertical direction could compensate for the effects of gravity on the shaft 12 when at rest as above described. Such nonuniform spring rate might also be used to detune a broad band engine rotor vibratory resonance.

The bearing support may also be mounted to the engine frame 14 in a variety of different and conventional ways other than as depicted in FIG. 1 and the specific shapes of the components of the support may vary accordingly.

Figure 6:
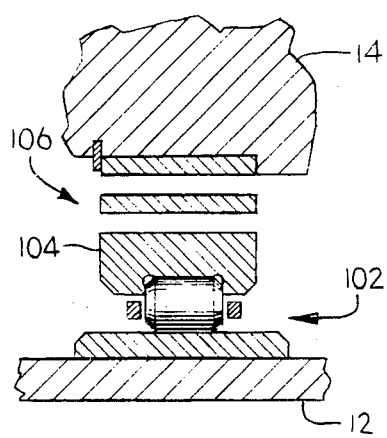
FIG. 6 is a fragmentary cross sectional view showing another bearing support embodiment for the FIG. 1 engine including a roller type bearing assembly and a bearing support mounted radially outwardly thereof.

The embodiment of the invention illustrated in FIG. 6 shows that other conventional bearings besides ball bearings may be used, i.e., roller bearing assembly 102. This embodiment also shows that the second shell 104 of the bearing support 106 shown can also act as an integral outer race to the roller bearing assembly 102. Damping may not be necessary for this bearing application so that no oil supply or seals are shown. In all other respects, this bearing support may be the same as those described above except that the roller bearing does not transmit axial loading to the frame.

A bearing support in accordance with another embodiment of the invention can also be used in conjunction with the new materials being introduced into modern engines. For example, it is most useful in engines utilizing ceramic bearings and/or ceramic shafts when high engine temperatures are expected.

Figure 8:
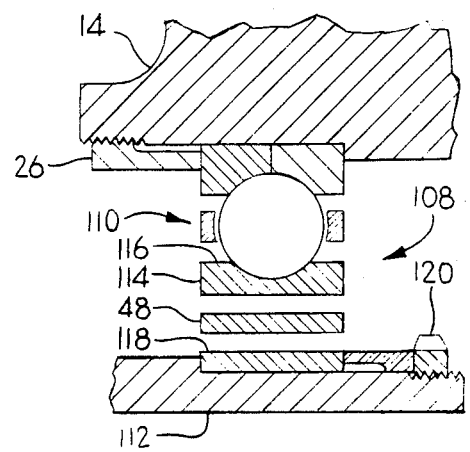
FIG. 8 is a sectional view taken along section line 8—8 of FIG. 7.
Figure 7:
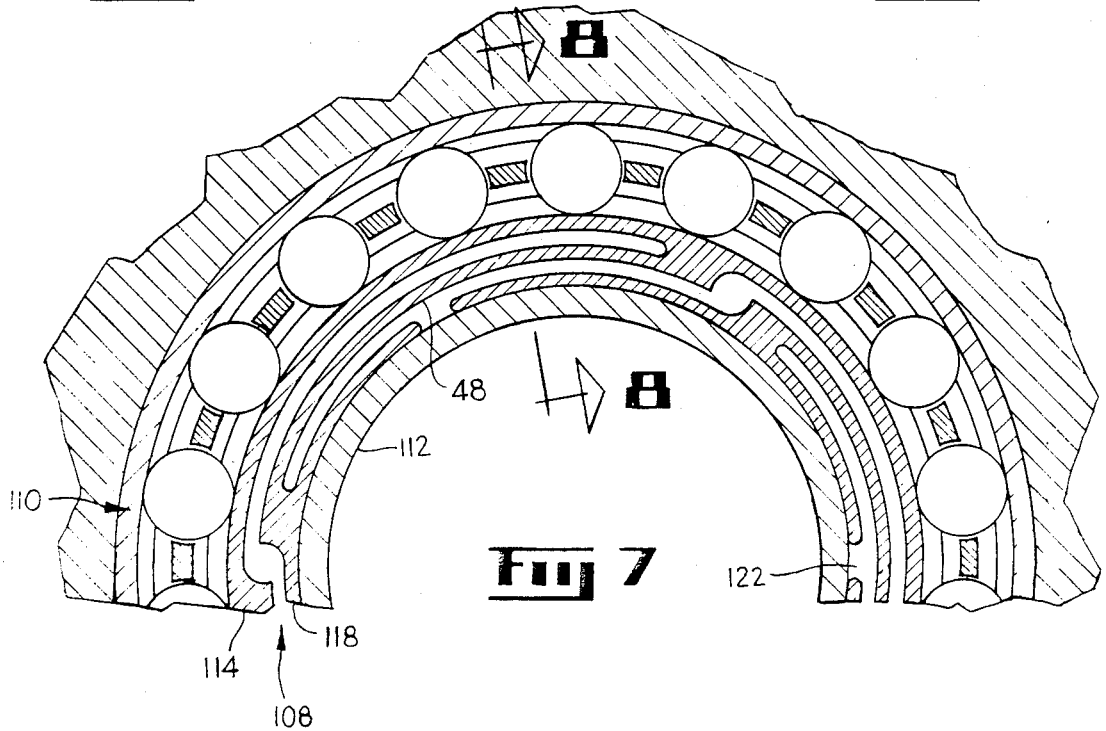
FIG. 7 is a sectional view similar to FIG. 2 of yet another bearing support embodiment wherein the support is mounted radially inwardly of the bearing asembly and supports a ceramic shaft.

FIGS. 7 and 8 are sectional views of a bearing support 108 that is mounted inside a ball bearing assembly 110 to control radial vibration of a ceramic shaft 112. In this case, the bearing assembly 110 is suitably mounted directly to the engine frame 14 and secured thereto by a locknut 26 in the same manner described above in connection with the support 18 in FIG. 1. A metal outer shell 114 of the support 108 forms an inner race 116 of the bearing assembly 110, and an inner shell 118 of the support 108 is secured to the shaft 112 by a locknut 120 in the same manner as shown in FIG. 1. Circsprings 48 are suitably attached to the shells 114, 118. The bearing support 108 rotates directly with the shaft 112 in this manner and is designed to accommodate thermal mismatching of the shaft 112 and the bearing assembly 110.

More particularly, the inner shell 118 is interrupted or formed with at least one axially extending gap 122. In the embodiment illustrated four circsprings 48 and four circumferentially spaced gaps 122 are shown. These axial gaps 122 permit the inner shell 118 to expand or contract with the shaft 112 without constraining either the shaft 112, the outer shell 114 of the support 108 or the bearing assembly 110. Accordingly, differential thermal expansion and contraction of the metal inner shell 118 and the ceramic shaft 112 abutting thereagainst can be accommodated to prevent fracture of the shaft 112.

Although the inner shell 118 of the support 108 is split, it does not act as a spring since it is in abutting contact with the shaft 112. Only circsprings 48 fixedly connected to inner shell 118 and outer shell 114 impart radial resiliency to the support 108. Because independent circsprings 48 are utilized, the inner shell 118 may be split without adversely affecting the integrity and performance of the bearing support 108.

In normal operation of all of the support embodiments described above, there are no significant wear or sliding surfaces between the supports and the engine frame. Nor is intermittant contact expected between the different parts of the support. Accordingly, the expected life of the support will not be reduced due to such a wear mechanism or intermittant contact.

As can be clearly seen from FIGS. 1–8, bearing supports embodying the principles of this invention can easily be varied to provide preferred spring rates and damping for a multitude of different rotors and engine frame configurations. Further, since the damping is integral with the circsprings of the support, the adjacent oil filled cavities or shims sometimes used with squirrel cage-type bearing supports can be eliminated. This results in a considerable saving of radial space and provides for more potential damping ability.

Even more important is the elimination of the long axial cantilevered spokes found in conventional squirrel cage bearing supports. Those spokes take up considerable axial space and thereby extend engine length. This increases engine weight and cost. The compact bearing supports disclosed herein thus can save engine weight, materials, and machining that would otherwise be required. Furthermore, the axially and radially compact bearing supports and simple frame geometry described above can produce considerable cost savings over the conventional squirrel cage supports. The bearing supports of the invention are also simple to assemble and permit simplification of adjacent engine support and damping structures.

Bearing supports embodying the principles of this invention also provide a more uniform restoring force than conventional ring springs. Ring springs exert point radial loads on the bearing race at each inner lobe, assuming outer race installation. In contrast, the present bearing supports are generally free of circumferential radial load variation. This is of most value when thin bearing races are used such as in a roller bearing having a channeled inner race and smooth thin outer race (reverse of roller bearing 102 in FIG. 6). In such a bearing, uneven radial load could deflect the outer race and produce uneven roller to race load, a factor that contributes to bearing failure.

While the invention has been described particularly with reference to the preferred embodiments thereof, it will be understood by those skilled in the art that various changes in form may be made therein without departing from the spirit or scope of the invention as described in the appended claims. For example, it would be possible to adapt this bearing support to a multitude of different bearing assembly types for use in variously configured motors, engines and machines. Further, the means of supplying damping fluid to the support may be varied depending on ease of access to the fluid supply.

Accordingly, what is desired to be secured by Letters Patent of the United States is:

I claim:

1. A bearing support comprising:
   an annular first shell;
   an annular second shell being coaxial with and spaced from said first shell for defining an annular space therebetween;
   at least one elongated, arcuate circspring disposed in said annular space and being substantially concentric with said first and second shells, said circspring having first and second opposing ends fixedly attached to said first and second shells, respectively; and
   damping means including means effective for channeling a damping fluid into said annular space for cooperating with said circspring for damping vibration.

2. A bearing support according to claim 1 further including three circumferentially spaced circsprings.

3. A bearing support according to claim 2 wherein said three circsprings are circumferentially aligned at a single radius.

4. A bearing support according to claim 2 further including bearing means disposed radially inwardly of said second shell, said first shell being mountable to an engine frame.

5. A bearing support according to claim 2 further including bearing means disposed radially outwardly of said first shell and radially inwardly on an engine frame, said second shell being mountable to an engine shaft.

6. A bearing support according to claim 2 wherein said circsprings are sized and configured to produce a radial restoring force which is substantially uniform around the circumference of the support.

7. A bearing support according to claim 2, wherein said second shell includes a plurality of axially-extending gaps therethrough for accommodating differential thermal expansion and contraction with an annular member disposable in abutting contact with said second shell, said gaps being equidistantly circumferentially-spaced for dividing said second shell into a respective plurality of second shell portions, each having a midpoint disposed generally equidistantly between adjacent ones of said gaps, and each of said circsprings being connected to a respective one of said second shell portion midpoints.

8. A bearing support according to claim 2 wherein each of said circsprings has a radial thickness and an axial width, said width being larger than said thickness, for providing axial thrust bearing capability.

9. A bearing support according to claim 8 wherein a width-to-thickness ratio of said circsprings is at least 4:1.

10. A bearing support according to claim 2 wherein said circsprings are sized and configured to produce a non-uniform radial restoring force around the circumference of the support.

11. A bearing support according to claim 10, wherein said bearing support has a vertical centerline axis and a lateral centerline axis disposed generally perpendicularly to said vertical centerline axis and wherein said circsprings are sized and configured for obtaining stiffness in a vertical direction greater than stiffness in a lateral direction.

12. A bearing support according to claim 11, wherein said circsprings located adjacent to said vertical centerline axis are relatively shorter in length than said circsprings located adjacent to said lateral centerline axis for accommodating dead weight provided by a shaft supportable in said bearing support.

13. A bearing support according to claim 11, wherein said circsprings located adjacent to said vertical centerline axis are relatively thicker than said circsprings located adjacent to said lateral centerline axis for accommodating dead weight provided by a shaft supportable in said bearing support.

14. A bearing support according to claim 2 wherein said second shell includes an axially extending gap therethrough for accommodating differential thermal expansion and contraction with an annular member disposed in abutting contact with said second shell.

15. A bearing support according to claim 14 wherein said annular member comprises a ceramic shaft disposed radially inwardly of said second shell and coaxial therewith.

16. A bearing support according to claim 2 wherein each of said circsprings comprises first and second portions interconnected at a jog portion so that said first and second circspring portions have different radii, and said second circspring portions overlap said first circspring portions of adjacent circsprings.

17. A bearing support according to claim 16 wherein said damping means includes means effective for channeling oil into said annular space between said overlapping first and second circspring portions, whereby said circsprings provide both a radial spring force for said bearing support and a surface area effective for cooperating with said oil for damping vibration.

18. A bearing support according to claim 17 further including foil inserts disposed in said annular space between said circsprings for providing additional surface area for increasing damping.

19. A bearing support according to claim 1 further comprising:

a plurality of said first circsprings disposed between said first and second shells;

a third annular shell disposed coaxial with and spaced radially from said second shell for defining a second annular space therebetween; and a plurality of second circsprings fixedly attached to said second and third annular shells.

20. A bearing support according to claim 19 further comprising four first circsprings and three second circsprings.

21. A bearing support according to claim 19 wherein said first circsprings extend from said first shell to said second shell in a first circumferential direction, and said second circsprings extend from said second shell to said third shell in a second, opposite, circumferential direction.

22. A bearing support according to claim 19, wherein said first circsprings have a first spring rate and said second circsprings have a second spring rate, said first spring rate being relatively larger than said second spring rate so that said second circsprings accommodate forces transmitted between said first and second shells during normal operation of a shaft mountable in said bearing support, and said first circsprings accommodate for overload forces in excess of said forces transmitted between said second and third shells during normal operation.

23. A bearing support for a gas turbine engine comprising:

a first annular shell;

a second annular shell being coaxial with and spaced from said first annular shell for defining an annular space therebetween;

at least three elongated, arcuate circsprings circumferentially spaced within said annular space and being substantially concentric with said first and second shells, each of said circsprings having first and second opposing ends fixedy attached to said first and second shells, respectively, and each having a radial thickness and an axial width, said width being larger than said thickness for providing axial thrust bearing capability; and damping means including means for channeling oil into said annular space between said circsprings, whereby said circsprings provide both a radial spring force for said bearing support and a surface area effective for cooperating with said oil for damping vibration.

24. A bearing support according to claim 23 wherein each of said circsprings comprises first and second portions interconnected at a jog portion so that first and second circspring portions have different radii and said second circspring portions overlap said first circspring portions of adjacent circsprings.

* * * * *